(12) United States Patent
Vogel

(10) Patent No.: US 7,777,447 B2
(45) Date of Patent: Aug. 17, 2010

(54) BATTERY POWERED WELDER SYSTEM UTILIZING VEHICLE POWERED AC INVERTER

(75) Inventor: Bernard J. Vogel, Troy, OH (US)

(73) Assignee: Illinois Tool Works Inc., Glenview, IL (US)

( * ) Notice: Subject to any disclaimer, the term of this patent is extended or adjusted under 35 U.S.C. 154(b) by 610 days.

(21) Appl. No.: 11/729,469

(22) Filed: Mar. 29, 2007

(65) Prior Publication Data

US 2007/0278993 A1  Dec. 6, 2007

(51) Int. Cl.
*H02J 7/00* (2006.01)
*B23K 9/06* (2006.01)

(52) U.S. Cl. .................. 320/107; 219/130.4

(58) Field of Classification Search ........... 320/107, 320/122, 126, 128, 140; 318/139, 801; 363/17, 363/98, 132; 219/130.4; 327/143
See application file for complete search history.

(56) References Cited

U.S. PATENT DOCUMENTS

| | | | |
|---|---|---|---|
| 4,950,864 A * | 8/1990 | Campiotti et al. ........ 219/130.4 | |
| 5,410,126 A | 4/1995 | Miller et al. | |
| 5,963,442 A * | 10/1999 | Yoshida et al. ............... 363/98 | |
| 6,172,333 B1 * | 1/2001 | Stava .................... 219/137 PS | |
| 6,204,476 B1 * | 3/2001 | Reynolds et al. ........ 219/130.51 | |
| 6,388,232 B1 * | 5/2002 | Samodell et al. ........ 219/130.33 | |
| 6,974,932 B2 * | 12/2005 | Holverson et al. ..... 219/130.51 | |
| 7,049,545 B2 | 5/2006 | Matus et al. | |
| 7,183,517 B2 | 2/2007 | Albrecht et al. | |
| 2003/0164645 A1 | 9/2003 | Crandell | |
| 2005/0109748 A1 | 5/2005 | Albrecht et al. | |

FOREIGN PATENT DOCUMENTS

| | | |
|---|---|---|
| DE | 202004019007 U1 | 2/2005 |
| EP | 1535691 | 6/2005 |
| GB | 2316244 | 2/1998 |

* cited by examiner

*Primary Examiner*—Edward Tso
*Assistant Examiner*—M'Baye Diao
(74) *Attorney, Agent, or Firm*—Fletcher Yoder PC

(57) ABSTRACT

A system and method, in certain embodiments, adjusts a charging output based on capabilities of various power sources. The system and method may be used to charge a variety of equipment such as welders, cutters, induction heaters, tools and so forth. For example, a charging circuit configured to change an output charge level based upon capabilities of multiple power sources configured to be coupled to the charging circuit. In some embodiments, the system and method may test the capabilities of the various power sources by evaluating an actual output versus a commanded output, and reduce the commanded output if the actual output falls below a desired level.

18 Claims, 7 Drawing Sheets

US 7,777,447 B2

BATTERY POWERED WELDER SYSTEM UTILIZING VEHICLE POWERED AC INVERTER

BACKGROUND

The present invention relates generally to welding, cutting and/or induction heating systems in remote locations away from a power grid.

Welding, cutting and/or induction heating systems generally include a power supply configured to supply a current used in the operation of the respective system. In these systems, the current may be passed through, near or, around a work piece to weld the work piece, cut the work piece and/or heat the work piece. Typically, the power supply receives alternating current (AC) power from a power grid and conditions the power for use in the specific system. In some applications, the power grid may be unavailable to provide power to the specific system. For example, in the off-road enthusiast market, a portable welder may be useful for making welding repairs to a vehicle in a remote location or where the use of a traditional system would be impracticable. Generators are often used to supply power to portable welders. Unfortunately, these generators are bulky and expensive.

BRIEF DESCRIPTION

In certain embodiments, a welding, cutting, and/or induction heating system includes a charging circuit and a battery both configured to receive power from a plurality of sources. For example, in one embodiment, a system includes a charging circuit configured to change an output charge level based upon capabilities of multiple power sources configured to be coupled to the charging circuit. The system also includes a battery coupled to an output of the charging circuit. In addition, the system includes a cutting circuit, a welding circuit, an induction heating circuit, or a combination of the thereof, coupled to the battery.

In accordance with another embodiment, a system includes a charging circuit configured to automatically detect capabilities of a power source coupled to the charging circuit and configured to automatically set a charging output level based on the capabilities of the power source.

In accordance with yet another embodiment, a portable tool includes a battery, an output coupled to the battery and a charging circuit coupled to the battery and configured to set a charging level based on an output capability of a plurality of different power sources.

In accordance with another embodiment, a method of charging includes automatically detecting capabilities of a power source, which includes: commanding generation of at least one pulse on an output of a charging circuit coupled to the power source, sensing an actual power level generated on the output, and detecting a capability of the power source based on the actual power level generated on the output. The method also includes automatically setting a charge level output of the charging circuit based on the capability detected.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
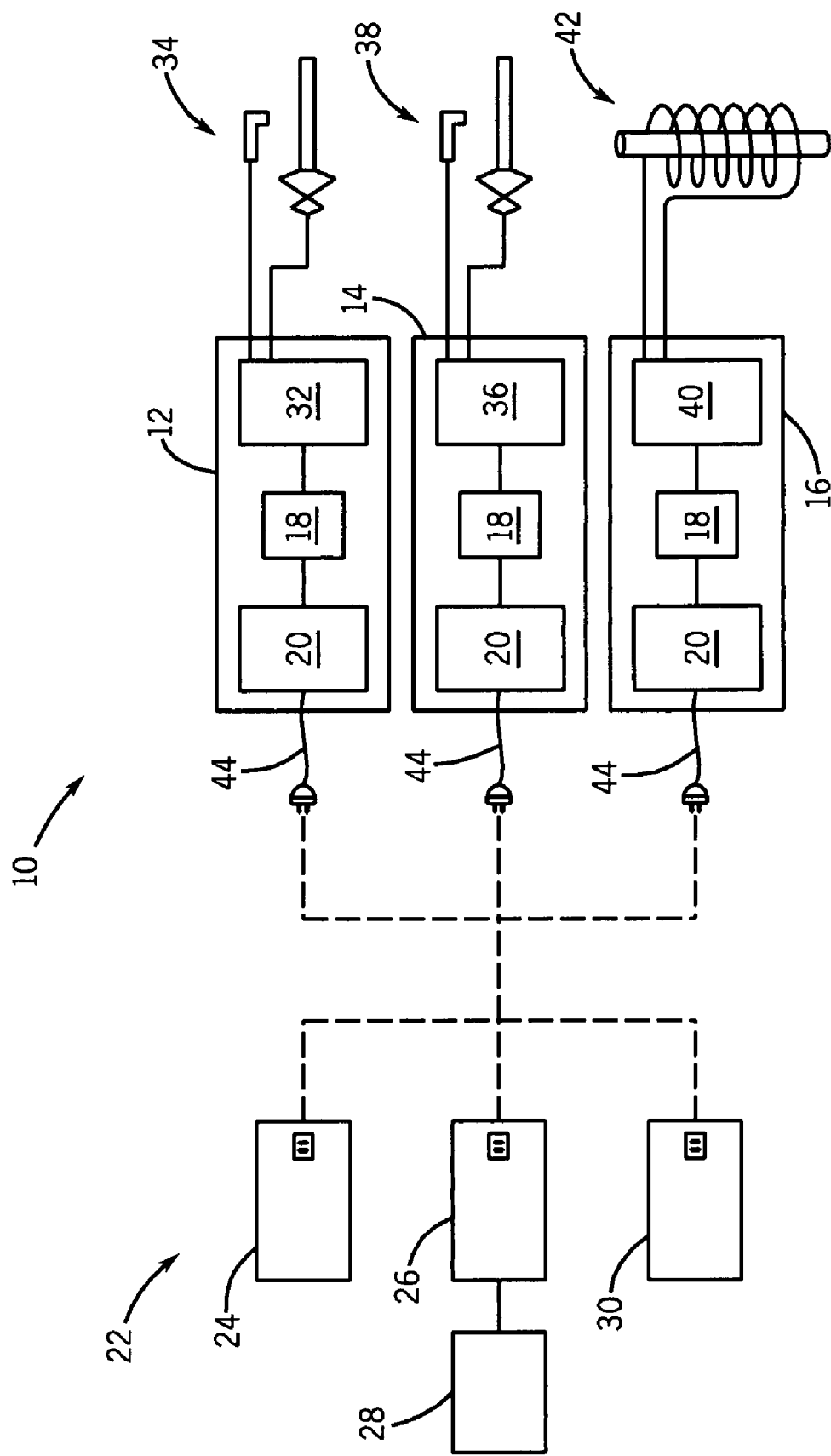
FIG. 1 is an illustration of an exemplary welding system, cutting system, and induction heating system in accordance with embodiments of the present invention.

Referring now to the drawings FIG. 1 illustrates a power source-responsive, variable input level charging system 10 in accordance with one embodiment of the present technique. As discussed below, the charging system 10 is adjustable based on the power capabilities of the particular power source coupled to the system 10. The illustrated system 10 includes a welding system 12, a cutting system 14 and an induction heating system 16. However, the system 10 may be employed with a variety of other industrial equipment, tools, and so forth. As discussed in detail below, each of the systems 12, 14 and 16 may include a battery 18 configured to store and supply power to each of the respective systems. The batteries 18 may be rechargeable and, thus, each of the systems 12, 14 and 16 may include a charging circuit 20 configured to receive and condition power from one of a plurality of power sources 22 and to deliver the conditioned power to the battery 18. In the illustrated embodiment, the power source 22 may include a power grid 24 providing alternating current (AC) power, an AC inverter 26 coupled to a vehicle power system 28, or other AC or DC power sources 30. Each of the systems 12, 14 and 16 may be capable of receiving power from at least one, or all, of the power sources 22.

As discussed in greater detail below, in one embodiment, the charging circuit 20 may vary the power output to charge the battery 18 based on the power source 22 that is providing power to the charging circuit 20. For example, an embodiment may include the charging circuit 20 reducing the power level supplied to battery 18 and increasing the time to charge the battery 18 of the system 12, 14, and 16 if the power source 22 is not capable of supplying the power initially desired to charge the battery 18. As will be discussed further below, an embodiment may include a manual input or application specific cable to enable the charging circuit 20 to identify the capabilities of the power source 22. Moreover, the charging circuit 20 may be configured to automatically detect the capabilities of a power source 22 and adjust the power output to the battery 18 accordingly. In some embodiments, automatically detecting the capabilities of the power source 22 may include the charging circuit 20 commanding a pulse of output power (e.g., current and/or voltage) and monitoring the actual power level output from the charging circuit 20 to determine if the power source 22 is capable of supporting the commanded power level. Furthermore, an embodiment may include the charging circuit 20 commanding a series of pulses at differing power levels to more accurately determine the capability of a power source 22. Accordingly, the flexibility of the charging circuit 20 may enable connection of each of the systems 12, 14 and 16 with one or more power sources 22 and enable optimized charging of the battery 18.

As depicted in FIG. 1, the system 10 includes power sources 22, the welding system 12, the cutting system 14, and the induction heating system 16. The power sources 22 may be configured to supply an AC current to the systems 12, 14 and 16. In one embodiment, one of the power sources 22 may include an AC power grid 24 delivering power at 115 Volts AC (VAC) or 230 VAC. For example, the AC power grid 24 may supply power via a power outlet (such as a wall socket). An AC power grid 24 is generally capable of continuously supplying a large quantity of power. In other words, the AC power grid 24 should generally be capable of supplying approximately 1000 Watts (W) of power that may be desired to charge a battery 18 at full capacity.

The power sources 22 may also include an AC inverter 26. Generally, the AC inverter 26 may include an electronic circuit for conversion of direct current (DC) to alternating current (AC). Thus, the AC inverter 26 may enable a 12 or 24 volt battery (such as a vehicle battery) to supply AC power to operate electrical devices that are typically powered from an AC source (such as an AC power grid 24). In one embodiment, as illustrated in FIG. 1, the AC inverter 26 may be electrically coupled to a vehicle power system 28. For example, the AC inverter 26 may be connected to a vehicle battery or a vehicle's electrical system (e.g., battery, generator, etc.) via a 12 VDC auxiliary power plug (e.g., a cigarette lighter plug). Thus, the inverter 26 may convert the DC power of vehicle power system 28 to an AC power capable of operating the welding system 12, the cutting system 14 and/or the induction heating system 16. For example, an inverter 26 may be designed to convert the 12 VDC provided from a vehicle power system 28 to 115 VAC. As will be appreciated, AC inverters 26 may include a variety of features and capabilities depending on the specific model.

One feature of the AC inverter 26 may include its ability to deliver a given amount of power. In other words, an inverter 26 may be limited by the maximum power level that it can output. For example, an inverter may be capable of delivering a maximum of 100 Watts of power and, thus, is not capable of supplying enough power to operate a device using 1000 W (such as embodiments of the charging circuit 20). Inverters 26 that have a limited capacity may include unique responses to a demand for power in excess of what the inverter 26 can supply (i.e., an overload). For example, upon an overload, some inverters 26 may shutdown completely and require a manual reset, others may "fold-back" their output voltage or current to limit the power output, while others may shutdown temporarily and, then, automatically restart themselves. As will be discussed in further detail below, not all inverters 26 are capable of supplying the full amount of power demanded and, thus, system 10 may require adapt the charging circuit 20 to operate from the limited power supplied.

The power sources 22 may also include other power sources 30 that are not typically characterized as a power grid 24 or an inverter 26. For example, the other power source 30 may include generators, alternators, converters, or other power systems, that are capable of supplying AC or DC power. In the system 10, these other power sources 30 may supply lesser, greater, or equal levels of power as desired by the charging circuit 20 of the systems 12, 14 and 16.

As discussed above, the system 10 may include the welding system 12, the cutting system 14 and/or the induction heating system 16. In one embodiment, these systems 12, 14, and 16 may be provided separately as the only unit in each system 10. For example, the system 10 may include a battery operated welding system 12 without the functionality of the cutting system 14 or the induction heating system 14. Another embodiment of the system 10 may include any combination the systems 12, 14, and 16. For example, a single system 10 may include the welding system 12 and the cutting system 14 contained in a single unit. Thus, such an embodiment may include a single charging circuit 20 and battery 18 operating the welding system 12 and the cutting system 14. Further, the system 10 may include other similar systems that may be configured to operate under similar AC power limitations.

Each of the welding system 12, the cutting system 14 and the induction heating system 16 may include a similar arrangement of components. In one embodiment, each system 12, 14 and 16 may include a charging circuit 20, a battery 18, and an additional circuit configured to provide welding, cutting or induction heating. For example the welding system 12, the cutting system 14 and the induction heating system 16 may include a welding circuit 32, a cutting circuit 36, and an induction heating circuit 40, respectively. These circuits 32, 36 and 40 may be configured to enable the desired functionality of each system. In other words, the circuits may be configured to control operation of welding implements 34 (such as a welding torch), cutting implements 38 (such as a plasma cutter) and or an induction heating implements 42 (such as an induction heating coil).

In one embodiment, the charging circuit 20 may receive AC power from one of the plurality of power sources 22 and convert this power to an output configured to charge the battery 18. For example, an output of the charging circuit 20 may be electrically coupled to battery 18 and provide a given amount of current and voltage to charge the battery 18. In another embodiment, the charging circuit 20 may convert at least a portion of the power received to an output configured to operate other circuits 32, 34, 36. For example, when the charging circuit 20 is not connected to a power source 22, the welding circuit 32 may operate, at least primarily, from power supplied by the battery 18. However, when the charging circuit 20 is connected to a power source 22, the welding circuit 32 may draw power from both the charging circuit 20 and/or the battery 18. The cutting system 14 and the induction heating systems 16 may be configured in a similar manner. The operation and configuration of the charging circuit 20 is discussed in further detail below.

The battery 18 may be provided to store power for operation of the systems 12, 14 and 16. As mentioned previously, the battery 18 may include a rechargeable battery that is recharged via the charging circuit 20. The battery 18 may also be configured to deliver an appropriate voltage and current to support the demand of the systems 12, 14 and 16. In one embodiment, the battery 18 may include a lead-acid battery that is capable of being recharged. In another embodiment, multiple rechargeable batteries may be contained within the systems 12, 14 and 16. Thus, two or more batteries 18 may be provided in series to supply the power to operate the systems 12, 14 and 16. For example two 12 V sealed lead acid batteries may be connected in series to provide 24 V. Other batteries 18, configurations and voltages may also work. For example, the battery 18 may include a lithium-ion (Li-ION) battery, a nickel metal hydride (Ni-MH) battery, a nickel-cadmium (Ni—Cd) battery, and the like. Further, the battery 18 may include various other forms of energy storage devices, such as capacitors or inductors.

As discussed above, the welding system 12 may include the welding circuit 32 configured to enable welding. In one embodiment, the welding circuit 32 may include circuitry to control a metal inert gas (MIG) welder, tungsten inert gas (TIG) welder, stick welder, or other form of welder. Such systems may include numerous components including: a power supply configured to receive power from the battery 18 and/or the charging circuit 20, a source of welding material, a shielding gas source, and welding implements 34 (such as a welding torch and cabling). In an embodiment, the power supplied by the battery 18 may be configured to provide a welding current to a work piece via the welding implements 34. The current generally creates an arc at a weld location and, thus, creates the weld by heating the work piece and a welding material.

Similar to the welding system 12, the cutting system 14 may include a cutting circuit 36 and cutting implements 38. In one embodiment, the cutting circuit 36 may include circuitry to control a plasma cutter. Such systems may include numerous components including a power supply configured to receive power from the battery 18 and/or the charging circuit 20, a source of pressurized gas, and cutting implements 38 (such as a plasma torch and cabling). The power supplied by the battery 18 may be configured to provide a current to an electrode within a plasma torch. During operation of a plasma cutter, a powerful spark is generated at the electrode which converts a pressurized gas into plasma. The plasma is ejected from the nozzle at a high rate and, thus, creates a cut by reducing a cutting area to a molten slag. The plasma also acts to conduct electrical current from the electrode to the work piece and maintain the arc.

Further, the induction heating system 16 may include the induction heating circuit 40. In one embodiment, the induction heating circuit 40 may include circuitry to control an induction heater. Such systems may include numerous components including a power supply configured to receive power from the battery 18 and/or the charging circuit 20 and heating implements 42 (such as an induction coil) configured to deliver the electric current to the work piece. During the operation of an induction heating system 16, an induction coil may be energized with a radio-frequency electric current. The radio-frequency electric current generates a high-frequency electromagnetic field that acts on either an electrically conductive or a ferromagnetic work piece.

The system 10 may also include other circuits configured to provide power to operate a variety of devices. In an embodiment, the system 10 may include an AC power output capable of supplying power to a plurality of devices. For example, such a system 10 may include a charging circuit 20 and battery 18 electrically coupled to a 115 VAC output. Accordingly, the AC output may enable powering of additional tools or devices. Further, AC output may operate as an uninterrupted power supply (UPS). For example, the AC output may provide burst of high output power for a given duration and the lower power AC inverter may keep the battery 18 replenished.

Returning now to the charging circuit 20, the following discussion considers the operation and configuration of the charging circuit 20. As briefly discussed above, the charging circuit 20 may be provided to charge the battery 18 and properly route the power within the systems 12, 14 and 16. Further, the systems 12, 14 and 16 and, thus, the charging circuit 20 may be capable of receiving power from a plurality of different power sources 22. In one embodiment, the systems 12, 14 and 16 may be plugged into the power grid 24, the AC inverter 26, or the other power sources 30. For example, the charging circuit 20 may be capable of receiving and conditioning power from each of the power sources 24, 26 and 30. Thus, as depicted, the cable 44 used to supply power to the systems 12, 14 and 16 may be plugged into any of the power sources 22. As a further illustration, a welding system 12 may be plugged into a wall outlet connected to the power grid 24 to provide an initial charge of the battery 18. Subsequently, the welding system 12 may be plugged into the AC inverter 26 that is located in a car to keep the battery 18 charged and ready for use. Such a system may include the portable welding system 12 contained in a single housing such that an off-road driving enthusiast may use the welding system 12 on remote trails.

Figure 2:
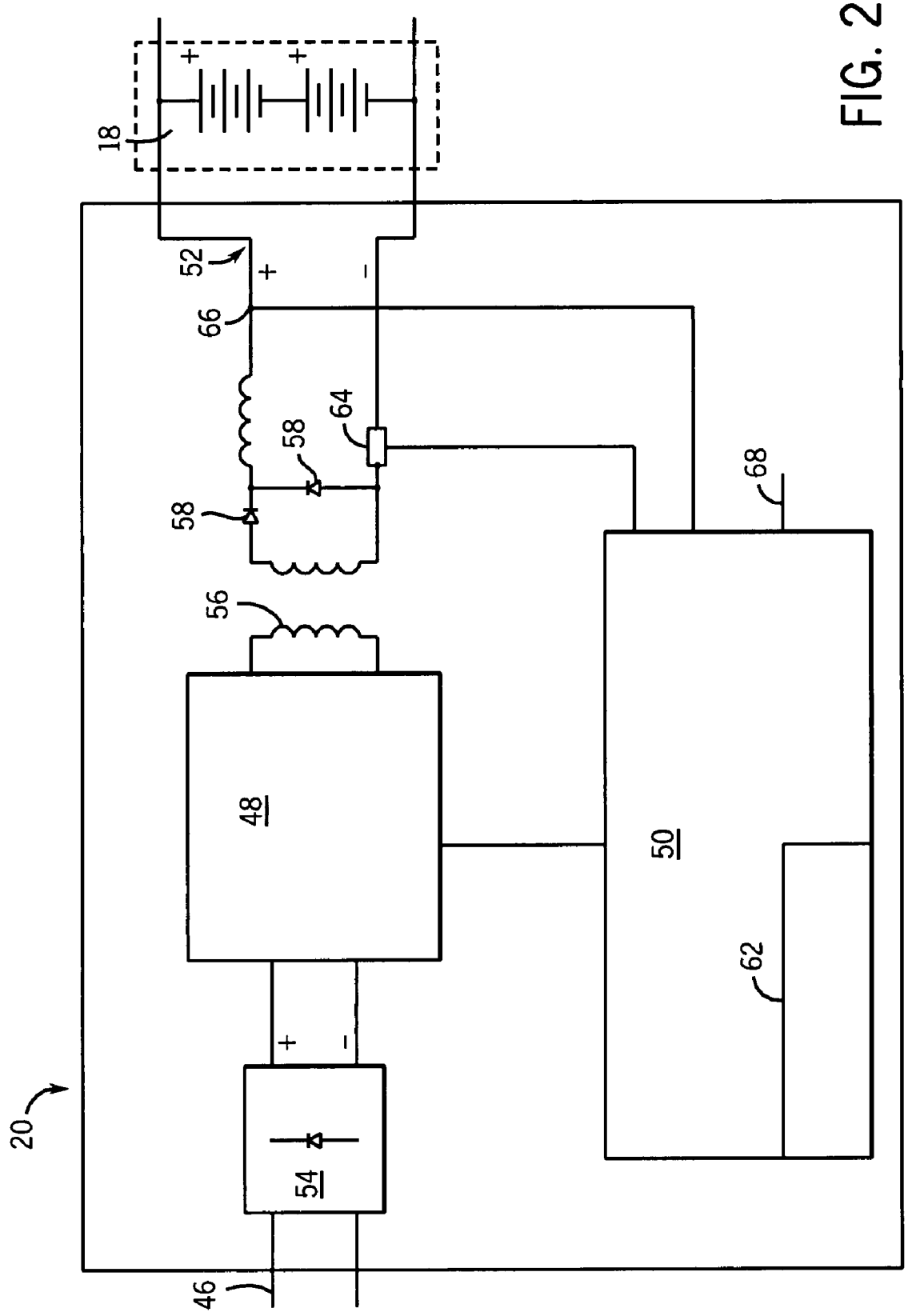
FIG. 2 is a schematic of an exemplary embodiment of a charging circuit of the systems of FIG. 1.

As discussed previously, the charging circuit 20 may provide a DC output to the batteries to replenish the charge in the batteries 18 and may also provide some portion of the power to the welding, cutting and/or induction heating circuits 32, 36 and 40. In accordance with this functionality, the charging circuit 20 may include various components to properly receive and distribute power. Referring now to FIG. 2, illustrated is a block diagram of an embodiment of the charging circuit 20. As depicted, the embodiment of the charging circuit includes an AC power input 46, a power circuit 48, a controller circuit 50 and a power output 52. In one embodiment, the AC input 46 may be electrically coupled to one of the power sources 22. For example, the cable 44 may be coupled to the AC input 46 on one end and coupled to one of the power sources 22 on the other end (see FIG. 1). As will be discussed in greater detail below, the cable 44 may include an additional feature to assist the charging circuit 20 in identifying the power source 22 that is coupled to the charging circuit 20.

In one embodiment, the charging circuit 20 may include a rectifier 54. For example, the charging circuit 20 may include a rectifier 54 that converts AC power from the AC input 46 to a DC bus voltage. Within the systems 12, 14 and 16, the DC bus voltage may be delivered to various components.

A power circuit 48 may be included in the charging circuit 20. In one embodiment, the power circuit 48 converts the DC bus voltage to a DC output voltage and current level that is configured to recharge the battery 18 and/or provide some portion of the power to the welding, cutting and/or induction heating circuits 32, 36 and 40. In a further embodiment, the power circuit 48 may include a transformer 56 that provides additional conditioning of the power output from the power circuit 48. For example, as depicted, the power circuit 48 may provide a voltage and a current to a transformer 56 that is configured to convert the power output to a voltage level desired at the battery 18 and/or other components within the system 12, 14 and 16 (such as the welding circuit 32, the cutting circuit 36 and the induction heating circuit 40). Output diodes 58 may be configured to rectify the output of the transformer 56 to the desired direct current at the power output 52.

The power circuit 48 may be monitored and controlled within the charging circuit 20, in one embodiment. For example, the controller circuit 50 may control the operation of the power circuit 48. In one embodiment, the controller circuit 50 may include a microprocessor that includes analog circuitry, digital circuitry and/or non-volatile memory 62. Thus, the controller circuit 50 may provide the necessary control signals (such as gate and drive signals) to the power circuit 48 to provide the desired output current, voltage or power level. For example, the controller circuit 50 may command a given power output via control signals that are configured to control operation of the power circuit 48.

To properly charge the battery 18, the controller circuit 50 may implement a charge algorithm that is configured to control the output of the power circuit 48. For example, the charging algorithm may dictate the duration and level of power supplied to the battery 18 to maintain optimal charging conditions. In one embodiment, the controller circuit 50 may include a feedback loop to monitor the power output and control the output of the power circuit 48 in accordance with the charge algorithm. For example, as depicted in FIG. 2, the control circuit 50 may be coupled to an output current sensor 64 that is configured to provide feedback relating to the output current, and coupled to an output terminal 66 that is configured to provide the controller circuit 50 with a signal representative of the output voltage of the power output 52. Based on these inputs and the charge algorithm, the controller circuit 50 may provide suitable signals to control the power circuit 48. In another embodiment, the control circuit 50 may also monitor a temperature input 68. For example, the temperature input 68 may provide a signal indicative of the temperature of the battery 18 and/or the temperature of the controller circuit 50. Thus, the output of the power circuit 48 may be optimized for charging the battery 18 via the power output 52.

Further, the controller circuit 50 may include memory to store information relating to the charge algorithm as well as other functions. In one embodiment, the controller circuit 50 may include non-volatile memory 62 that is capable of storing information. For example, the non-volatile memory may include an Electronically Erasable Programmable Read-Only Memory (EEPROM) chip to store small amounts of volatile (configuration) data. Other memory may be used, including RAM and Flash memory.

As discussed above, the performance of the systems 12, 14 and 16 may be limited by the power source 22 that is powering the system 12, 14 and 16. More specifically, when using a power source 22 with a limited power output (such as an AC inverter 26), the charging circuit 20 may not be capable of providing the full amount of power desired to charge the battery 18 and/or operate other components of the system 12, 14 and 16. Thus, when connected to the power grid 24, the charging circuit 20 may be able to provide the battery 18 with a charging profile that includes a 1000 W output power. However, when connected to the AC inverter 26, or other power source 30, that may only provide 100 W of power to the system 12, 14 and 16, the charging circuit 20 may not be capable of outputting the desired 1000 W of power and, thus, the charging circuit 20 may modify the charging profile and the power output accordingly. Although setting an appropriate power level may be implemented simply, detecting the limitation and capabilities of the power supply 22 may prove more difficult.

Figure 3:
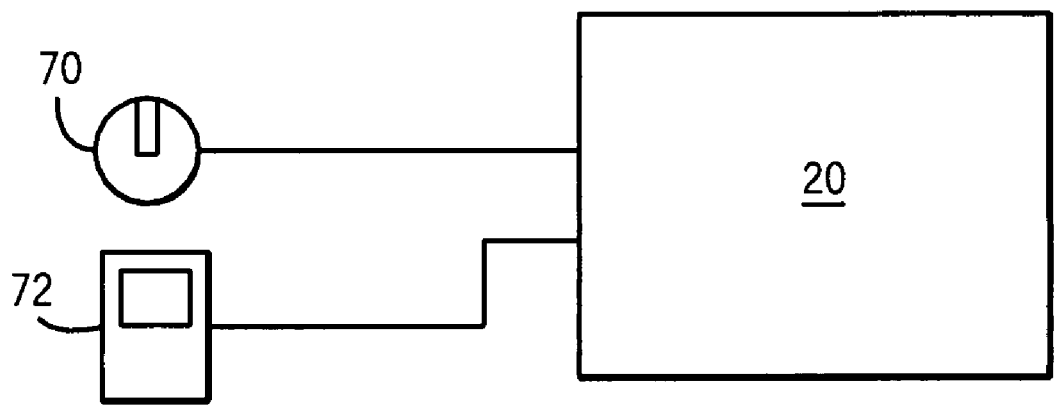
FIG. 3 is a schematic of a switch and an input device coupled to the charging circuit of FIG. 2.

To resolve the problem of detecting limitations of the power supply 22, the system 12, 14 and 16 may include a device to identify the limitations of the power supply 22. In an embodiment, the system 12, 14 and 16 may include a switch 70 configured to identify the limitations of the power supply 22. For example, as depicted in FIG. 3, a switch 70 may be electrically coupled to the charging circuit 20. Thus, the switch position may be adjusted by the user in accordance with the power supply 22 connected and the charging circuit 20 may adjust its output accordingly. The switch 70 may include knobs, buttons or other input devices. For example, an embodiment may include the switch 70 configured to enable an operator to select between power grid 24 and an AC inverter 26. In another embodiment, the switch 70 may include multiple current settings. Further, an embodiment may include a device in electrical communication with the charging circuit 20. For example, a user may connect a communication device 72 (such as a handheld computer) to the charging circuit 20 and communicate the limitation of the power source with the charging circuit 20 via serial or other communications protocols.

Figure 4:
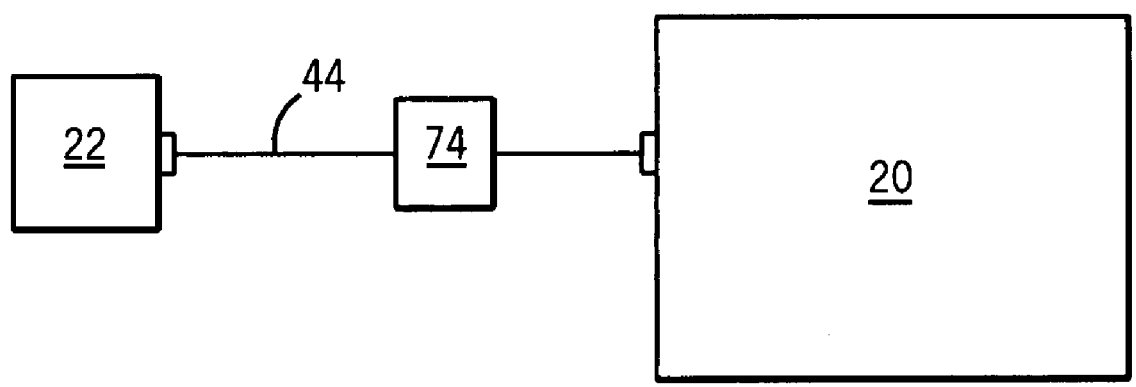
FIG. 4 is a schematic of an alternate embodiment of the cable of FIG. 1.

In another embodiment, a connection device may include a feature to identify the limitations of the power source 22. For example, as depicted in FIG. 4, the cable 44 that is used to connect the power source 22 to the system 12, 14 and 16 may include an identification feature 74. In one embodiment, the identification feature 74 may include a resistor, or the like, that is electrically coupled to the charging circuit 20 when the cable 44 is connected to the charging circuit 20. Thus, the charging circuit 20 may sense a resistance of the resistor and identify the capabilities, type, or other characteristics of the power supply 22 connected based on the sensed resistance value. For example, the cable 44 used to connect the system 12, 14 and 16 to the AC power grid 24 may contain a 200 Ohm resistor, where as the cable 44 used to connect the system 12, 14 and 16 to the AC inverter 26 may include a 400 Ohm resistor. Therefore, if the charging circuit 20 senses a resistance value of 400 Ohms, the charging circuit 20 may recognize the power source 22 as the AC inverter 26 and adjust the output of the charging circuit 20 accordingly. The distinguishing feature may also be used to identify specific characteristics of the power supply 22, such as the maximum power level output, and/or the ability of the device to reset after an overload condition.

Figure 5:
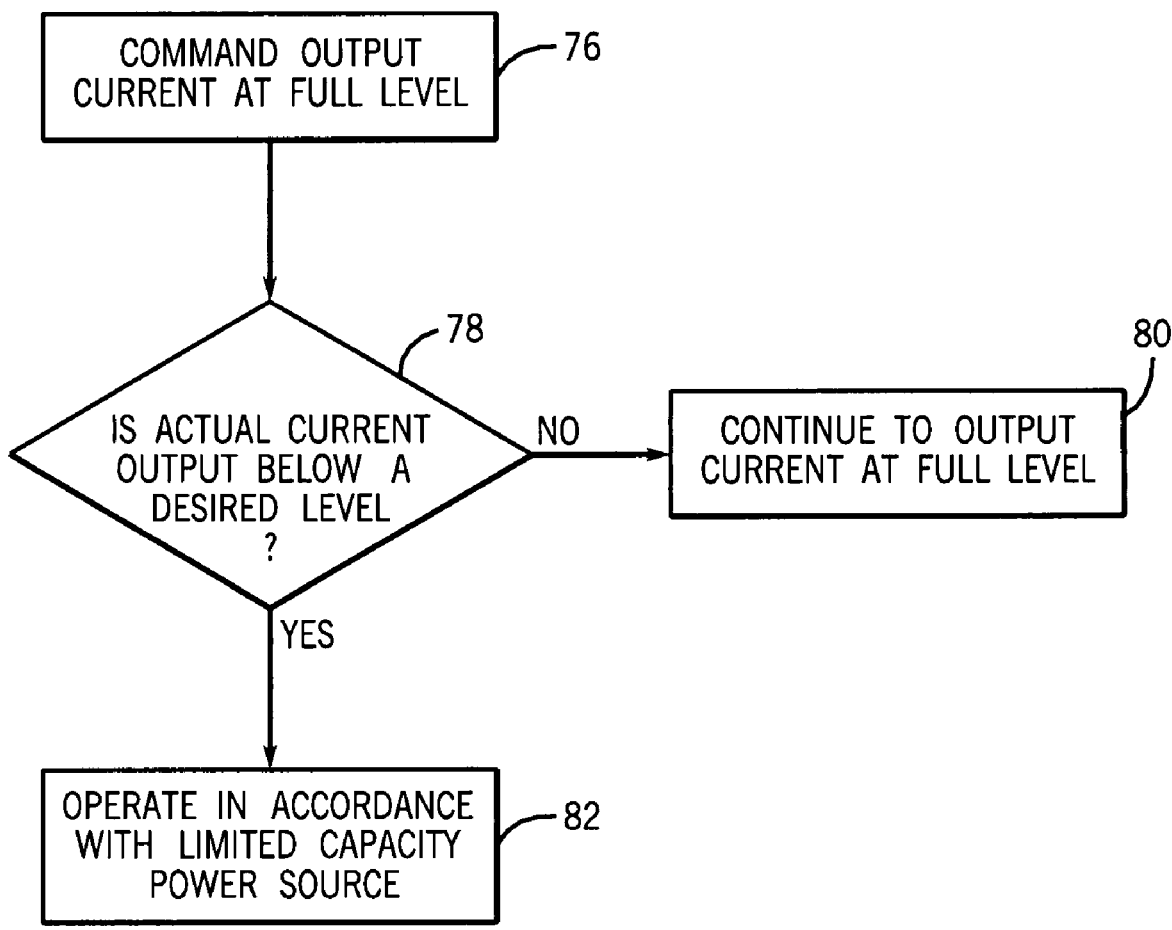
FIGS. 5, 6 and 7 are flowcharts illustrating a method of operating the charging circuit of FIG. 2.

Although a manual switch 70 or an identification feature 74 may be useful to identify the capabilities and limitation of the power supply 22, other solutions may prove valuable. One solution may include a system that automatically detects the capabilities and limitations of the power source 22 and adjust the functionality of the system 12, 14 and 16 accordingly. For example, the system 10 may identify whether a power source 22 is capable of supplying the full power level desired to charge the battery 18 and/or capable of powering components of the system 12, 14 and 16. Turning now to FIG. 5, a flowchart depicts a method to identify whether the power supply 22 is capable of supplying the full power level desired to charge the battery 18 and/or power components of the system 12, 14 and 16. For example, the first step may include the charging circuit 20 commanding output current at a full level, as depicted as block 76. In one embodiment, the command may include a signal from the controller circuit 50 to the power circuit 48 to generate a power output at a given level. For example, the given level may be set at a value that is used to charge the battery 18 when the power supply 22 is capable of delivering the demanded power (such as a power grid 24). After the command for a current at full level, the charging circuit 20 may monitor the actual current produced on the output 52 to determine if the actual current output is below a desired level, as depicted in block 78. For example, referring back to FIG. 2, the controller circuit 50 may monitor the output current and voltage via the output current sensor 64 and the output terminal 66. Thus, the controller circuit 50 may establish whether the actual current output is above the desired level. In one embodiment, the desired level may be based on the level desired to provide full power to charge the battery 18.

If the actual power output is above the desired level, the system 12, 14 and 16 may continue to operate in accordance with a power supply that is capable of supplying the desired power level. For example, as depicted at block 80, the charging circuit 20 may continue to output current at the full level. However, if the actual current output is below the desired level, this may indicate a power source 22 that is capable of supplying a limited capacity of power (such as an AC inverter 26). Thus, as depicted in block 82, the system 12, 14 and 16 may operate in accordance with a limited capacity power source. For example, as will be discussed in greater detail below, the charging circuit 20 may limit the output power to a reduced level or attempt to find an optimum reduced level based on other detected characteristics of the power supply 22.

Figure 6:
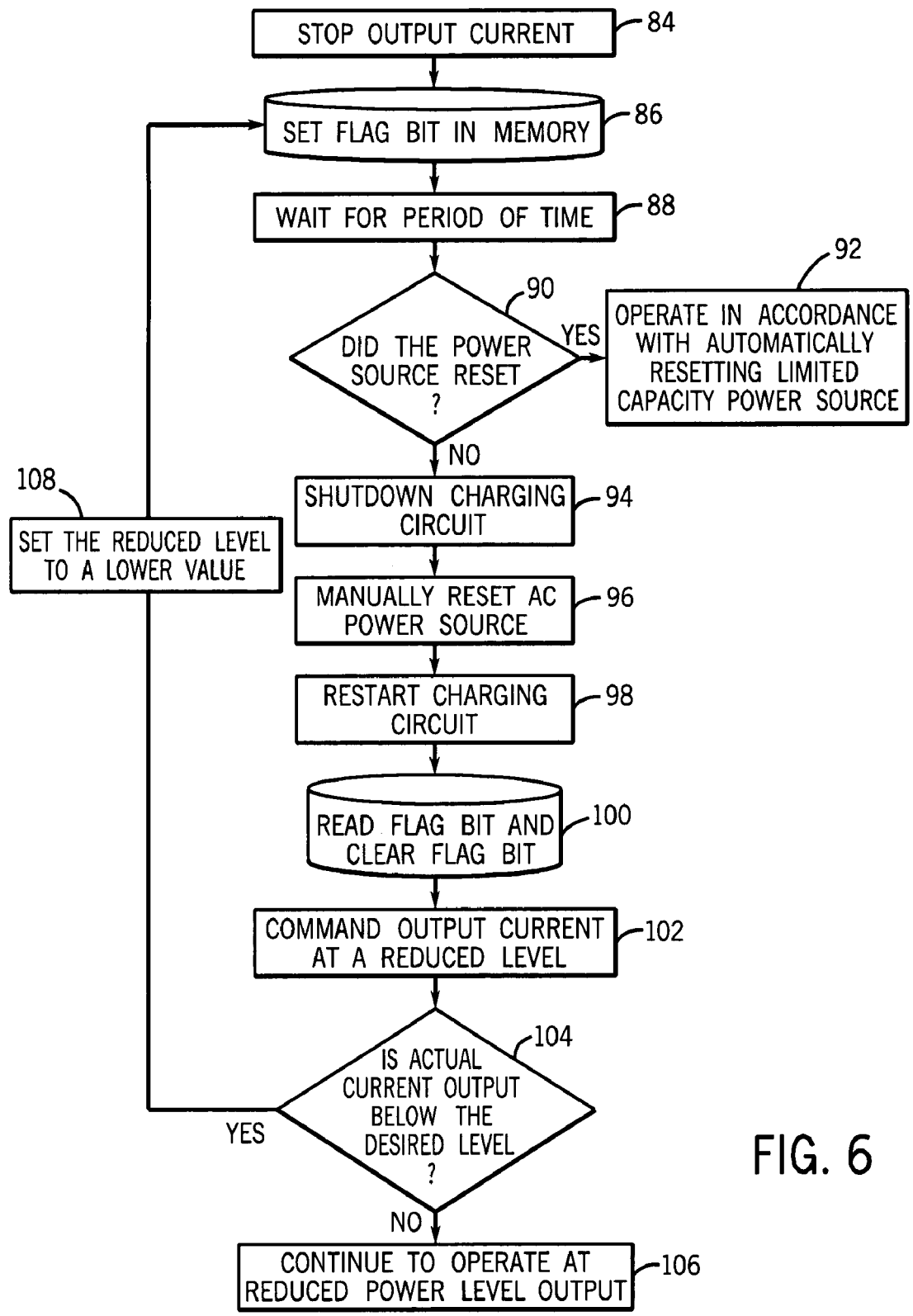

Turning now to FIG. 6 an alternative method is provided in place of block 82. Accordingly, FIG. 6 illustrated a method of operating in view of a limited capacity power source 22. The illustrated method includes detecting if the power source 22 automatically resets itself and controlling the operation of the system 12, 14 and 16 accordingly. In one embodiment, after determining the current output is below a desired level (see FIG. 5, blocks 78 and 82), the system 12, 14, and 16 may stop the output current, as illustrated at block 84. For example, once the controller circuit 50 of the charging circuit 20 has detected the actual output power level is not sufficient, the controller circuit 50 may stop the command to output current at a full level.

Next, an embodiment may include setting a flag bit in memory, as depicted at block 86. Setting a bit in memory may be a useful step in an embodiment that is attempting to identify other characteristics of the power source 22. For example, as will be noted below in discussion of block 100, a flag bit may be used to indicate whether the power source 22 has previously failed to provide a desired output level. After setting the flag bit, the system 12, 14 and 16 may wait for a period of time, as indicated by block 88. In one embodiment, waiting a period of time may provide enough time for the power source 22 to reset. For example, if a power source 22 shutdowns on over load, the power source 22 may not reset automatically and, thus requires a manual reset. However, if the power source 22 folds back its power output, or automatically resets, the time period may provide the power source 22 an opportunity to do so.

After the time period has expired, the system 12, 14 and 16 may determine if the power source reset, as depicted at block 90. For example, the charging circuit 20 may check to see if there is any input power at the AC input 46. If the power source 22 has reset, then the system 12, 14 and 16 may operate in accordance with an automatically resetting limited capacity power source, as depicted at block 92. In other words, if the power source 22 has reset, it is known that the power source 22 does not generally require a manual reset after an overload condition. As is discussed in greater detail below in reference to FIG. 7, the operations at block 92 may be varied to optimize the distribution of the power from the power source 22. As depicted at block 94, if the power source does not reset, the next step may include shutdown of the charging circuit 50. If the power supply 22 shuts down, then the step of shutting down the charging circuit at block 94 may be accomplished via commands of the controller circuit 50, or by the general lack of a power source 22 which suspends or terminates operation of the charging circuit 20. Following the shutdown of the charging circuit (block 94), an operator may manually reset the AC power source, as depicted at block 96. In one embodiment, this may include an operator simply flipping a breaker that has tripped or replacing a fuse that has burned out on the AC inverter 26. Further, the charging circuit may be restarted, as depicted at block 98. In one embodiment, the charging circuit 20 may be manually restarted by an operator in cooperation with the manual reset of the AC power source 22 (block 96). In another embodiment, the charging circuit 98 may automatically restart. For example, upon detecting a power source shutdown and/or a manual reset of the AC power source 22, the controller circuit 50 may initiate a restart. Thus, the charging circuit 20 may restart automatically.

After restarting, one embodiment may include reading and clearing the flag bit, as depicted in block 100. For example, as alluded to earlier, the flag bit may indicate that a previous cycle included a current below a desired value. Thus, upon restart of the charging circuit 20, the bit may be read from memory and indicate a need to command an output current at a reduced level. In other embodiments, the flag bit may be configured to indicate the reduced current level or other information relevant to the operation of the charging circuit 20. For example, the actual output level may be set in memory at block 86, and the charging circuit 20 may be configured to output a reduced level based on the actual output set in memory.

Once the charging circuit 20 has detected that flag bit has been previously set to indicate an overload at full current level, the controller circuit 50 may command an output current at a reduced level, as depicted at block 102. In one embodiment, the reduced level may include a previously set level that a majority of AC inverters 26 are capable of providing. For example, a predetermined current may be used to provide a "trickle" charge to the battery 18 as opposed to a full power "rapid" charge. In another embodiment, the reduced power level may be based on the flag bit and/or information recorded in memory at block 86.

After commanding the output current at a reduced level (block 102), the controller circuit 50 may monitor the actual power output to determine if the actual current output is below the desired level, as depicted at block 104. In one embodiment, this step may be performed to ensure that the power source 22 is not overloaded. For example, as depicted at block 106, if the actual power output is not below a desired level, the charging circuit 50 may continue to operate at the reduced current level. However, if the actual current output falls below the desired level, the charging circuit 20 may reduce the commanded current to an even lower value. For example, as depicted, at block 108, the charging circuit 20 may set the reduced current level to a lower value. After setting the reduced value to a lower level, the charging circuit 20 may return to operations at block 86 of the method to verify if the power source 22 has reset, and operate accordingly. This operation may continue until the actual current output does not fall below the desired level.

Figure 7:
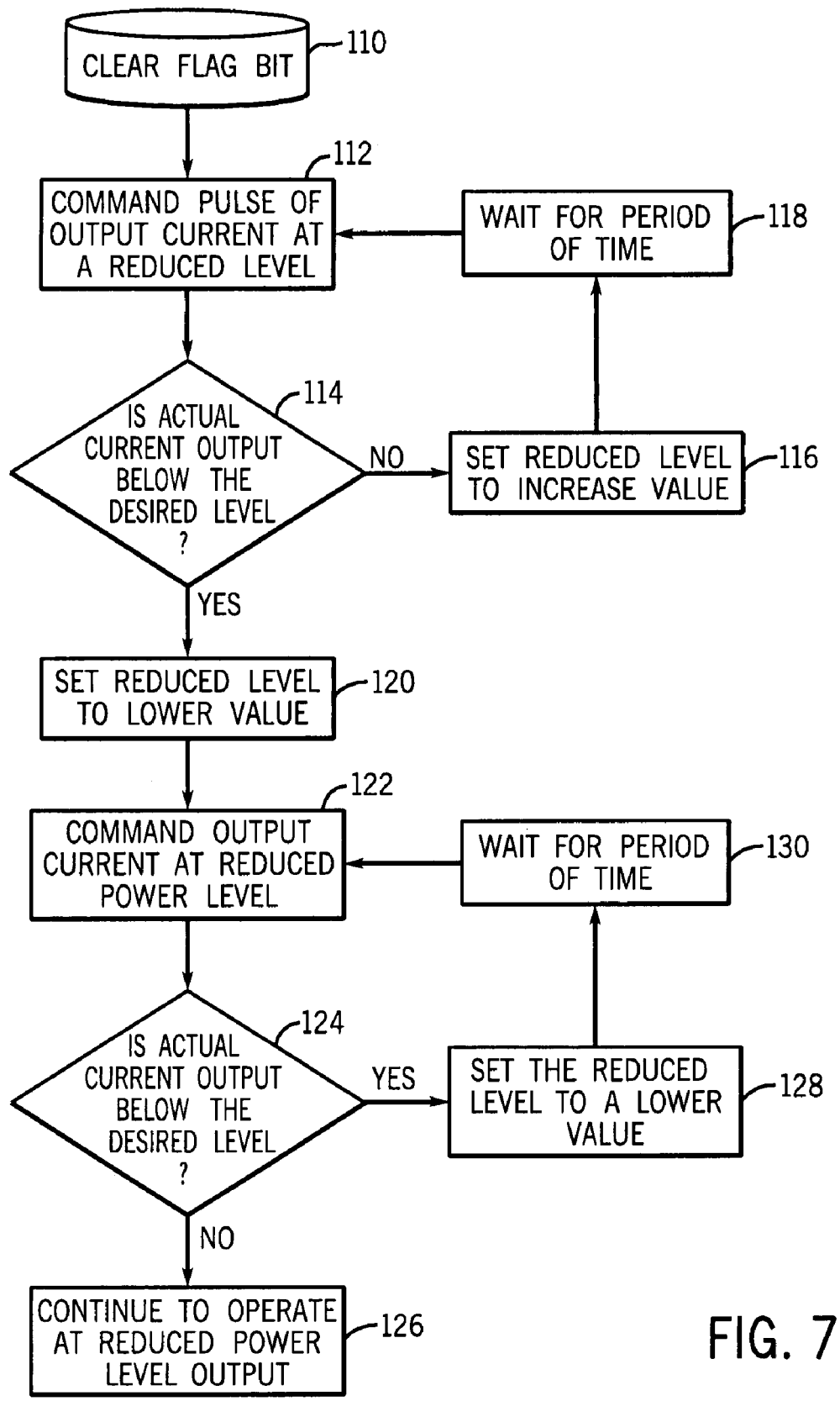

As discussed briefly above, block 92 may include operating in accordance with an automatically resetting limited capacity power source. Turning now to FIG. 7, a flowchart illustrates a method of operating in accordance with an automatically resetting limited capacity power source. First, as depicted in block 110, the system 12, 14 and 16 may clear the flag bit referred to in block 86 of FIG. 6. For example, once the controller circuit 50 has detected that the power source 22 may reset after an overload, there is no longer a need to read the flag bit, as the charger control is already aware of the state of the power source 22. Considering that an output at full level is not supported by the power supply 20 (refer to FIG. 5, block 78), the charging circuit 20 may implement a routine to determine the optimal value that the charging circuit 20 may operate. It is also worth noting, that because the power supply 22 automatically resets, the charging circuit 20 may implement a routine that commands pulses at a variety of level without a significant possibility of requiring a manual reset by the operator.

In one embodiment, the routine may include initially generating a sequence of pulses over a range of values. For example, an initial pulse may be commanded at a low value, with each subsequent pulse increasing in value until the actual output is below the desired/expected output level. After determining the maximum pulse that produces an actual output that is desirable, the charging circuit 20 may set the operating output accordingly. Such a routine is illustrated in the method of FIG. 7. For example, an initial pulse may be generated, by the controller circuit 50 commanding a pulse of output current at a reduced level, as depicted at block 112. In one embodiment, the pulse may include a period of only a half-second, at a given level. Next, the controller circuit 50 may monitor the output of the charging circuit 50 to determine if the actual current output is below the desired level, as depicted at block 114. In one embodiment, the controller circuit 50 may monitor the output simultaneous to the command to generate the reduced level pulse (block 112). The "desired level" may include a percentage of the reduced level commanded at block 112. If the controller circuit 50 determines that the current output is not below the desired level, the controller circuit 50 may set the reduced level to an increased value, as depicted in block 116. For example, at this point, the controller circuit 50 "knows" that the power source 22 is capable of providing the previously requested power level (block 112), and may now increase the commanded output to determine a maximum power that may be provided by the power supply 22. After increasing and setting the reduced level to an increased value (block 116), the controller circuit may wait for a period of time (block 118) and command a pulse of output current at a reduced level (block 112). This cycle may continue until it is determined that the actual current output is below the desired level (block 114).

In a cycle where the charging circuit 20 determines that the current output is below the desired level, the controller circuit 50 may set the "reduced level" to a lower value, as depicted at block 120. In one embodiment, the "lower value" may be a percentage of the previous "reduced value." Thus, the new "reduced value" will not overload the power source 22 and generate a reset condition. In another embodiment, the new "reduced power level" may be set at the last operative current level that provided a current that was not below the desired level. In such a configuration, the likelihood of a power source overload may be reduced significantly. Although commanding a "reduced power level" may reduce the likelihood of the power source 22 overloading, a check may still be performed, as depicted at block 124. In one embodiment, the controller circuit 50 monitors the output of the charging circuit 20 to determine if the actual power output is below the desired level (block 124). If the actual power is below the desired level, the controller circuit 50 sets the reduced level to a lower value (block 128), waits for a period of time (block 130) to enable the power source 22 to reset, and then commands an output at the reduced power level (block 122). This cycle may repeat until the actual current output is not below the desired level. The charging circuit 20 may continue to operate at the reduced power level output, as depicted at block 126.

As will be appreciated, the present technique is not limited to those methods described above. For example, the method for detecting and generating an output current may be located within the charging circuit 20 or within other components of the systems 12, 14 and 16. Further, other embodiments may include monitoring other conditions to automatically detect capabilities of the power sources 22 and or other components of the systems 12, 14 and 16. For example, embodiments may include monitoring conditions indicative of the input voltage (i.e., the voltage supplied by the power sources 22). For example, the system 10 may monitor an AC input voltage, current or power, rectified DC bus voltage, or another signal proportional to the input voltage.

Other variations may include alternate methods to detect an appropriate output level. In an embodiment, the system 10 and the control circuit 20 may include variations of the "pulses" described above. For example, instead of starting at an initially reduced pulse level and increasing the level during a sequence of iterations (see FIG. 7), the charging circuit 20 may initially command an increased current level and reduce the level in subsequent iterations until an acceptable current level is determined. Further, the system 10 may use other commanded outputs to detect an appropriate output level. For example, the system 10 may command a continuous power output that is ramped up or down to determine the limitations of the power source 22 and the system 10. Thus, the commanded output may include a linearly increasing curve, a "stair-step" curve or other test curve. Accordingly, the variations in the commanded output may enable detection of limitations of the system 10 and/or the power source 22.

Embodiments may also include monitoring and controlling other functions of the system 10. For example, once the charging circuit 20 has detected the capability of the power source 22, the charging circuit 20 can provide a specific charging routine (i.e., charging algorithm) based on the capabilities of the power source 22. A charging algorithm may generally set charging characteristics, such as charging at various voltage, current or power levels for certain periods of time, transitions to other phases based upon timer intervals, detected current, voltage or power thresholds and modifying voltage, current, power levels and/or timer intervals based on inputs, such as temperature. In an embodiment, the charging circuit 20 may modify the time intervals, output current, output voltage, or both based on the detected capability of the power source 22. For instance, if the power source 22 is limited and the output level is reduced, the charging circuit 20 may configure the charge routine to increase the time interval to account for the lower output. Further, the charging circuit 20 may modify various current/voltage thresholds used to detect when to transition from one phase of charging to another phase of charging.

Figure 8:
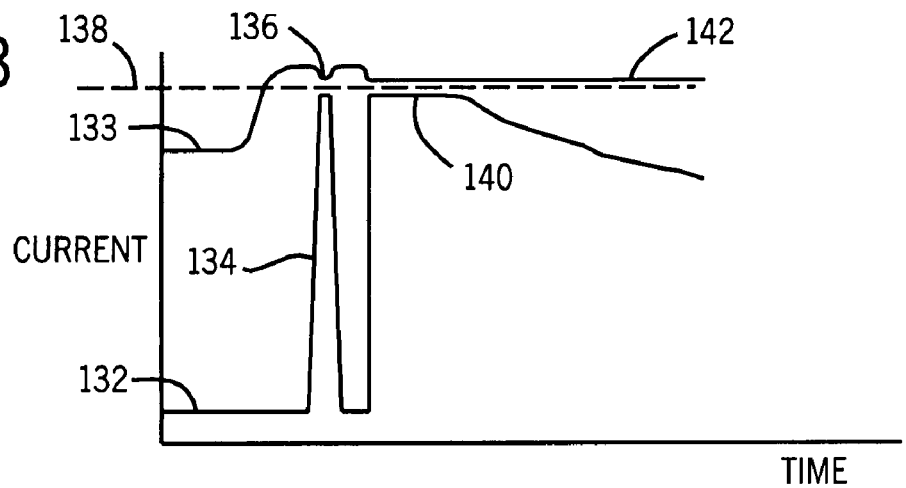
FIG. 8 is a graphical illustration of the relationship between the commanded and supplied current of an AC power source capable of supplying a commanded power.
Figure 9:
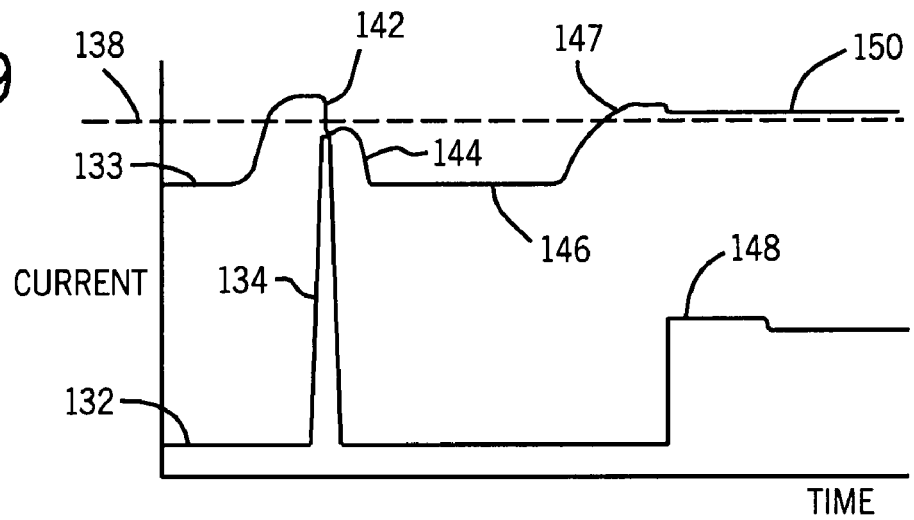
FIG. 9 is a graphical illustration of the relationship between the commanded and supplied current of an AC power source that does not automatically reset after a power overload.
Figure 10:
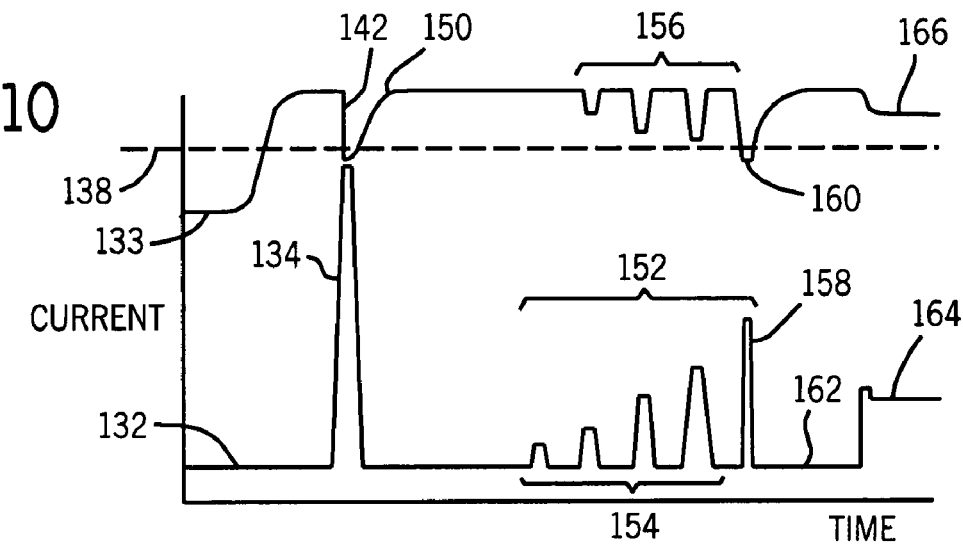
FIG. 10 is a graphical illustration of the relationship between the commanded and supplied current of an AC power source that automatically resets after a power overload.

Turning now to FIGS. 8, 9 and 10, depicted are plots representing a relationship between the actual current output 132 and the DC bus voltage (i.e., the output of rectifier 54, within charger 20) 133. For example, FIG. 8 depicts a response indicative of the actual current output 132 when a power source 22 that is capable of supplying a full power charge is coupled to the charging circuit 20. As depicted, a current pulse 134 of normal width indicates the charging controller's initial command for a full current output from the charging circuit 20. There is only a slight dip 136 in the DC bus voltage 133 indicating the power source 22 is capable of supplying the full power for the complete duration of the commanded pulse of current. At all times the DC bus voltage 133 remains above a minimum level 138. Thus, the charging controller 50 subsequently commands a current output at full level 140

FIG. 9 depicts the response of a limited capacity power source 22 that does not automatically reset after an overload condition. For example, the current pulse 134 indicates the charging controller's initial command for a full current output from the charging circuit 20. It can be seen that the DC bus voltage 133 has a dip 142 below a minimum level 138. Below this minimum DC bus voltage level 138 the charger 20 is no longer able to maintain the commanded output current level. This is sensed by the charger 20 and the pulse 134 is terminated prematurely. The DC bus voltage 133 continues to decrease 144 until it reaches nearly zero 146. After some time interval the power source 22 is manually reset and the DC bus voltage rises 147. The charger 20 subsequently operates at a reduced output current level 148. The output current is reduced sufficiently that the DC bus voltage 150 remains above a minimum level 138 so that the power source 22 is capable of supply the reduced level of output. Thus, in accordance with FIG. 6, the charging circuit 20 has detected the shutdown, restarted, and commanded a reduced current output level 148.

FIG. 10 depicts the response of a limited capacity power source 22 that automatically restarts after an overload condition. For example, the current pulse 134 indicates the charging controller's initial command for a full current output from the charging circuit 20. It can be seen that the DC bus 133 has dipped below a minimum level 138. Below this minimum DC bus voltage level 138 the charging circuit 20 is no longer able to maintain the commanded output current level. This is sensed by the charging circuit 20 and the pulse 134 is terminated prematurely. However, unlike the additional collapse in DC bus voltage 144 depicted in FIG. 9, the DC bus increases to a level 150 above the minimum level 138. Thus, the response indicates that the power source 22 automatically resets after an overload. Further, the sequence of pulses commanded 152 are consistent with the charging circuit's routine to determine the capability of the power source 22, in accordance with the method depicted in FIG. 7. For example, the first four current pulses commanded 154 resulted in respective drops in the DC bus voltage 156 that did not fall below the minimum level 138. However, the fifth command pulse 158 resulted in the DC bus voltage 160 dipping below the minimum value 138. Once the DC bus voltage dipped below the minimum level 138 the output current pulse could no longer be maintained. This was sensed by the charger 20, and the pulse of current terminated prematurely. As illustrated by the remainder of the plot, in response to the overload, the charging circuit 20 waited a period of time 162 before commanding a reduced output level 164. In response to the reduced output level, the DC bus voltage 166 did not fall below the minimum level 138 and, thus, the controller circuit 50 continued to command current at the reduced level 164.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a charging circuit configured to change an output charge level based upon capabilities of multiple power sources configured to be coupled to the charging circuit;
a battery coupled to an output of the charging circuit; and
a cutting circuit, a welding circuit, an induction heating circuit, or a combination thereof, coupled to the battery;
wherein the charging circuit is configured to automatically detect the capabilities of a power source; and
wherein the charging circuit is configured to command an output of a sequence of pulses on the output of the charging circuit, each subsequent pulse comprising a power level greater than the power level of the preceding pulse, and the charging circuit is configured to detect the capabilities of the power source based on an actual power level sensed on the output of the charging circuit in response to the commanded pulses.

2. The system of claim 1, wherein the power sources comprise an AC power grid, or an AC inverter or both.

3. The system of claim 1, wherein the system is contained within a single housing.

4. The system of claim 3, wherein the system is portable.

5. The system of claim 1, comprising a switch comprising selectable positions configured to change the output charge level based on capabilities of the multiple power sources.

6. The system of claim 1, comprising a cord that is configured to couple the charging circuit to at least one power source of the multiple power sources and that comprises an identifying characteristic configured to identify the capabilities of the at least one power source.

7. A system, comprising:
a charging circuit configured to automatically detect capabilities of a power source coupled to the charging circuit and configured to automatically set a charging output level based on the capabilities of the power source;
wherein the charging circuit is configured to command generation of a sequence of pulses on an output of the charging circuit, each subsequent pulse comprising a power level greater than the power level of the preceding pulse, and the charging circuit is configured to automatically detect the capabilities of the power source based on an actual power level sensed on the output of the charging circuit in response to the commanded pulses.

8. The system of claim 7, comprising a welding circuit, a cutting circuit, an induction heating circuit, or a combination thereof coupled to the to the charging circuit.

9. The system of claim 7, comprising a battery coupled to the charging circuit.

10. The system of claim 7, wherein the power source comprises an AC power grid, an AC inverter or both.

11. The system of claim 7, wherein the charging circuit is configured to command generation of at least one pulse on an output of the charging circuit and that is configured to automatically detect the capabilities of the power source based on an actual power level sensed on the output of the charging circuit in response to the commanded pulse.

12. The system of claim 11, wherein the charging circuit is configured to set the charging output level at a reduced level if the actual power level sensed on the output is below a desired level.

13. The system of claim 7, wherein the charging circuit is configured to continue to command a sequence of pulses until an actual power level sensed on the output of the charging circuit is below a desired power level, and wherein the charging circuit is configured to set the charging output level at a level configured to enable the actual power output to remain at or above a desired power level.

14. The system of claim 7, wherein the charging circuit is configured to detect a capability of the power source to reset after the power source is overloaded, and to set the charging output level based on the capability of the power source to reset after the power source is overloaded.

15. A portable tool, comprising:
a battery;
an output coupled to the battery; and
a charging circuit coupled to the battery and configured to set a charging level based on an output capability of a plurality of different power sources;
wherein the charging circuit is configured to command generation of a sequence of pulses on an output of the charging circuit, each subsequent pulse comprises a power level greater than the power level of the preceding pulse, and the charging circuit is configured to automatically detect the capabilities of the power source based on an actual power level sensed on the output of the charging circuit in response to the commanded pulses.

16. The portable tool of claim 15, wherein the charging circuit is configured to automatically detect the output capability of a power source coupled to the charging circuit.

17. The portable tool of claim 15, wherein the charging circuit is configured to set the charging level at a reduced level if the actual power level generated on the output is below a desired level.

18. A method of charging, comprising:
automatically detecting capabilities of a power source, comprising:
commanding generation of a sequence of pulses on an output of a charging circuit coupled to the power source, each subsequent pulse comprising a power level greater than the power level of the preceding pulse;
sensing an actual power level generated on the output;
detecting a capability of the power source based on the actual power level sensed on the output of the charging circuit in response to the commanded pulses; and
automatically setting a charge level output of the charging circuit based on the capability detected.

* * * * *